United States Patent [19]

Thomson et al.

[11] Patent Number: 4,501,685
[45] Date of Patent: Feb. 26, 1985

[54] CATALYTIC SELECTIVE HYDROGENATION OF ALIPHATIC UNSATURATION IN COPOLYMERS

[75] Inventors: Alasdair I. Thomson; Frank King, both of Reading, England

[73] Assignee: Johnson Matthey Public Limited Company, London, England

[21] Appl. No.: 530,360

[22] Filed: Sep. 8, 1983

[30] Foreign Application Priority Data

Sep. 10, 1982 [GB] United Kingdom ................ 8225813

[51] Int. Cl.³ .............................................. C08G 69/26
[52] U.S. Cl. .................................. 502/167; 528/338; 502/168; 502/182
[58] Field of Search ................ 252/470; 528/940, 338

[56] References Cited

FOREIGN PATENT DOCUMENTS 56-81305  7/1981  Japan.
2011911A  7/1979  United Kingdom.
2061961A  5/1981  United Kingdom.

OTHER PUBLICATIONS

Kirk–Othmer, Encyclopedia of Chemical Technology, 2nd Ed., vol. 4, N.Y., pp. 244–247.

*Primary Examiner*—John Kight
*Assistant Examiner*—Marvin L. Moore
*Attorney, Agent, or Firm*—Cushman, Darby & Cushman

[57] ABSTRACT

A catalyst system and process for the selective hydrogenation of aliphatic unsaturation in copolymers containing aromatic groups for example styrene-butadiene copolyers, the catalyst system comprising palladium supported on non-porous carbon black poisoned by a Lewis base containing nitrogen, phosphorus or sulphur moiety.

18 Claims, No Drawings

CATALYTIC SELECTIVE HYDROGENATION OF ALIPHATIC UNSATURATION IN COPOLYMERS

This invention relates to a catalyst system and to a catalytic process for the selective hydrogenation of aliphatic unsaturation in copolymers which also contain aromatic unsaturation. Aliphatic unsaturation may derive from the copolymerisation of conjugated polyenes, for example dienes and especially hydrocarbons such as butadiene or isoprene. Aromatic unsaturation may derive from for example the copolymerisation of styrene.

Aliphatic unsaturation provides sites which are easily oxidised in the presence of heat, ultra violet light or ozone and so renders the copolymer vulnerable to oxidative degradation.

Resistance to such degradation can be increased by hydrogenating the aliphatic unsaturation whilst the copolymer is in solution. However the hydrogenation must be highly selective towards the aliphatic unsaturation otherwise too much aromatic unsaturation will be lost leading to a decrease in the elastomeric properties and oil-resistance of copolymers of styrene with conjugated dienes.

Hitherto, selective hydrogenation of the copolymer solutions has been performed commercially using nickel catalysts but these are difficult to separate from the solution after hydrogenation. British patent specification No. 2,011,911A and Japanese patent specification No. 56/81305 both describe attempts to hydrogenate the copolymer solutions using catalyst systems comprising palladium carried on porous carriers such as activated carbon or porous carbon black. According to the Second Edition, Volume 4 of the "Kirk-Othmer Encyclopedia of Chemical Technology" published by Interscience of New York (see pages 244 to 247 the contents of which are herein incorporated by reference), a carbon black is regarded as porous if its surface area as measured by the nitrogen absorption technique is at least two or three times greater than its surface area when calculated from the so-called "average surface diameter" derived from electron microscope measurements as follows:

Average Surface Diameter = $\Sigma nd^3 / \Sigma nd^2$ where n is the number of particles of diameter d.

The nitrogen absorption technique offers a measure of both the external surface area of the carbon black and also any internal surface area it may have owing to the presence of pores. In contrast the electron microsope technique is mainly a measure of only external surface area.

Catalyst systems comprising porous carbon carriers such as those described in GB No. 2,011,911A or JP No. 56/81305 are more easily separated from copolymer solutions than the conventional nickel or cobalt systems but they do not hydrogenate with a commercially acceptable degree of selectivity towards the aliphatic unsaturation. In an attempt to achieve high selectivity towards the aliphatic unsaturation, British patent specification No. 2,061,961A resorts to the use of catalyst systems comprising rhodium on activated carbon. However rhodium is much more expensive than palladium and for this reason it is less capable of industrial application.

An object of this invention is to provide a catalyst system and a catalytic process which combine ease of separation of the catalyst system from the hydrogenated copolymer with high aliphatic hydrogenation activity and high selectivity of the hydrogenation towards the aliphatic unsaturation without the need to use rhodium as an essential component of the catalyst system.

Accordingly this invention provides a catalyst system comprising from 0.1 to 5% by weight of palladium supported on particulate carbon black (the percentage being based on the weight of non-porous carbon black in the system) and which is suitable for use in the selective hydrogenation of aliphatic unsaturation in copolymers which also contain aromatic unsaturation wherein the catalyst system also includes a poison comprising at least one poisoning moiety selected from nitrogen, phosphorus and sulphur moieties, wherein the carbon black is non-porous, especially non-porous to the extent that less than 80% (preferably less than 95%) of its surface area is located within open pores and wherein the ratio of the number of atoms of poisoning moiety in the poison to the number of atoms of palladium in the catalyst system is from 0.0005 to 0.25:1. The invention also provides a catalytic process for the selective hydrogenation of aliphatic unsaturation in copolymers which also contain aromatic unsaturation wherein the copolymer in a solution phase is subjected to the action of hydrogen in the presence of a catalyst system according to this invention.

The poisons may be for example carbon disulphide or oxyacids of phosphorus or their salts and esters, or organic mercaptans or sulphides (for example dialkyl sulphides especially when the alkyl group is methyl or ethyl), or sulphoxides (especially dimethyl sulphoxide) or aliphatic amines. Examples of aromatic poisons include aromatic heterocyclic compounds of nitrogen or sulphur. It has been noted that many of the poisons have in common the presence of an electron pair of the type found in Lewis bases. Preferred poisons with their electron pairs can be depicted as follows:

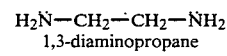
1,3-diaminopropane

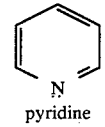
pyridine

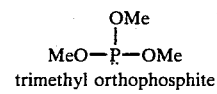
trimethyl orthophosphite

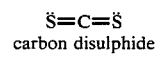
carbon disulphide

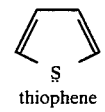
thiophene

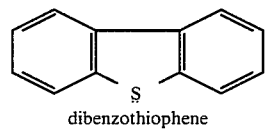
dibenzothiophene

Appropriate phosphorus compounds may be generated in situ by the action of hydrogen on an oxyacid of phosphorus or on its salts or esters.

Preferably the catalyst system should comprise poison in an amount such that the ratio of the number of atoms of any one of the poisoning moieties nitrogen, phosphorus or sulphur present in the poison to the number of atoms of palladium present in the catalyst system is from 0.001 to 0.1 (preferably 0.005 to 0.08):1. Surprisingly below at least a ratio of 0.1:1, increasing the amount of poison increases the selectivity of the catalyst system towards aliphatic hydrogenation but otherwise has little effect on catalytic activity. Preferably the catalyst system comprises from 0.5 to 2% by weight of palladium (the percentage being based on the weight of carbon black in the system). Amounts of palladium in excess of 5% are likely to destroy the selectivity of the system.

The preferred carbon blacks comprise particles all of which are retained by a 0.1 $\mu$m (and preferably by a 0.22 $\mu$m) sieve so as to facilitate separation from the copolymer solution. In order to ensure that these carbon blacks have a good degree of non-porosity, it is preferred that their surface area as determined by nitrogen absorption should be below 400 $m^2/g$. Efficient poisoning occurs if the pH of the surface of the carbon black is from 5 to 9 and for this reason it is preferred to use carbon blacks made by the furnace gas or oil processes, the thermal gas process or the lampblack or acetylene black processes. It is also preferred to use a carbon black which contains from 0.001 to 2.% (preferably to 0.85%) by weight of free or combined sulphur since this appears to increase the selectivity of the catalyst system. For ease of handling, the particles of non-porous carbon black may be formed into agglomerates. Agglomerates may be formed by simple compaction of the particles or by using some means (for example electrostatic attraction or an adhesive) to hole the particles together. The particles or agglomerates may also be mixed with coarser particulate material to aid filtration.

The process according to this invention is preferably operated at pressures of from 1 to 100 bar and especially at from 30 to 55 bar. The temperatures chosen for use in the process usually represent a compromise between high selectivity which is obtained at the lower temperatures and high aliphatic hydrogenation rate which is obtained at the higher temperatures. Crosslinking of the copolymer may be a problem at temperatures above 150° C. so in general the process may be operated between 30° and 120° C. with the commercially more attractive temperatures lying in the range 40° to 100° C. Suitable solvents include aliphatic hydrocarbons (for example cyclohexane) and aliphaticethers (for example diethyl ether). Ethers increase the rate of hydrogenation yet have little or no effect on selectivity. A typical concentration of copolymer in the solvent may be from 1 to 18% by weight but concentrations of from 0.5 to 15% by weight are preferred. The hydrogenation may be performed in batch or continuous processes using for example a stirred tank, a rocking autoclave or tubular reactor.

The invention is illustrated by the following examples of which A to F are comparative.

EXAMPLES 1 TO 8 AND COMPARATIVE EXAMPLES A AND B

These examples relate to the hydrogenation of a styrene-butadiene-styrene block copolymer believed to consist essentially of terminal aromatically unsaturated blocks composed of polymerised styrene linked by intervening aliphatically unsaturated blocks composed of polymerised butadiene. The average molecular weights of the copolymer, the styrene blocks and the butadiene blocks were 180,000, 30,000 and 120,000 respectively.

Each sample was dissolved in turn in cyclohexane to produce a solution containing 5% by weight of copolymer (based on the combined weight of copolymer and cyclohexane). Each solution was hydrogenated in turn by placing it in a rocking autoclave in amounts such that each 25 mls of solution contained 1 g of a catalyst system comprising palladium, various particulate carbon supports and (in the case of Example 1 to 8) various poisons as specified in Table 1, then heating and pressurising the autoclave to 49.35 bar (ie 50 atms) and to 90° C. and passing hydrogen into the solution to maintain the pressure. Hydrogenation was continued for 15 hours.

The catalyst system comprised 1% by weight of palladium (based on the weight of carbon support in the system) except in Example B where 5% palladium was used. In Examples 1 to 8 the amount of poison used was such that ratio of the number of atoms of phosphorus or sulphur in the poison to the number of atoms of palladium in the system was 0.01 to 1. The palladium was deposited on a carbon carrier by reducing an aqueous solution of a palladium salt in the presence of a slurry of the carrier at 90° C. The supported palladium was filtered off and dried and then (for Examples 1 to 7) poisoned either by slurrying in an aqueous dispersion of the poison or (in the case of poisons immiscible with water) by the addition of the poison to the solution in the rocking autoclave. In the case of Example 8, poisoning was performed by slurrying together the particles of the non-porous carbon carrying the deposited palladium with particles of coarse porous charcoal carrying phosphoric acid. During the slurrying, phosphoric acid transferred from the charcoal to the non-porous carbon where it was available to act as a poison.

In the case of Examples 1 to 8 and A the carbon carrier was a non-porous carbon black made by the furnace oil process and it had a surface pH of 8 to 9, a surface area (as determined by nitrogen absorbtion) of 220 $m^2/g$ and a minimum particle size such that all of the particles were retained by a 0.22 $\mu$m sieve. In Example B, the carbon carrier was a highly porous activated charcoal.

Table 1 shows the number percentage of unsaturated bonds (both aliphatic and aromatic) which were hydrogenated and also the number percentage of styrene moieties which would be hydrogenated if the hydrogenation reaction were to be continued until 98% of the aliphatic unsaturation in the copolymer had been hydrogenated. This latter figure is obtained by extrapolation of the resuls obtained after 15 hours. Comparison with Example A shows that the presence of a poison reduces the proportion of styrene which is hydrogenated whilst maintaining the total hydrogenation at a high level. Example B shows a highly porous carrier to be ineffective even when using large loadings of palladium which in any event could be expected to destroy selectivity.

TABLE 1

| Example | Poison | Carrier | % Palladium | % Total Hydrogenation | *Extrapolated % Styrene Hydrogenation |
|---|---|---|---|---|---|
| 1 | Pyridine | Carbon Black | 1 | 66 | 53 |
| 2 | 1,3-diaminopropane | Carbon Black | 1 | 76 | 53 |
| 3 | trimethylorthophosphite | Carbon Black | 1 | 60 | 30 |
| 4 | hypophosphorous acid | Carbon Black | 1 | 57 | 44 |
| 5 | dibenzothiophene | Carbon Black | 1 | 56 | 42 |
| 6 | thiophene | Carbon Black | 1 | 67 | 53 |
| 7 | carbon disulphide | Carbon Black | 1 | 68 | 39 |
| 8 | phosphoric acid | Carbon Black | 1 | 68 | 34 |
| A | None | Carbon Black | 1 | 75 | 62 |
| B | None | Charcoal | 5 | 0.05 | — |

*These results (and corresponding results in Tables 2 and 3) were obtained using analysis by infra red spectroscopy which tends to underestimate the degree of selectivity. NMR spectroscopy is expected to be more accurate and to indicate that a higher selectivity was in fact achieved.

EXAMPLES 6, 8 AND 10 COMPARATIVE EXAMPLES A, C AND D

The procedure of Example 6 was repeated for the purposes of Examples 7, 8, C and D except that the amount of carbon disulphide poison used was varied so as to vary the ratio of sulphur atoms to palladium atoms as shown in Table 2. It will be seen that activity is lost when the ratio reaches 0.25:1. It will also be seen that increasing the proportion of poison at least towards a ratio of 0.05:1 has a minimal effect on total hydrogenation activity but significantly increases the selectivity towards hydrogenation of aliphatic unsaturation.

TABLE 2

| Example | S/Pd Ratio | % Total Hydrogenation | Extrapolated % Styrene Hydrogenation |
|---|---|---|---|
| A | 0 | 75 | 62 |
| 9 | 0.001:1 | 66 | 51 |
| 6 | 0.01:1 | 68 | 39 |
| 10 | 0.05:1 | 70 | 36 |
| C | 0.25:1 | 0 | — |
| D | 0.5:1 | 0 | — |

COMPARATIVE EXAMPLES E AND F

The procedure of Example A was repeated except that the palladium was replaced by ruthenium or rhodium and the hydrogenation using rhodium was performed at 70° C. The results are shown in Table 3 from which it will be seen that the poisoned catalyst systems according to this invention (for example the system of Example 3) produce results at least similar to those obtained using the expensive rhodium components and that similar results are not obtained when ruthenium is used.

TABLE 3

| Example | Catalyst | % Total Hydrogenation | Extrapolated % Styrene Hydrogenation |
|---|---|---|---|
| A | Pd | 75 | 62 |
| E | Ru | 57 | 79 |
| F | Rh | 85 | 42 |
| 3 | Pd/Me$_3$PO$_3$ | 60 | 30 |

It is probable that similar results could be obtained using non-porous mineral carriers instead of carbon black. Typical carriers would be alumina, silica, calcium carbonate or titania. The weight ratios of palladium and poison to carrier would correspond to those used with carbon black provided that the ratios are adjusted to take account of the greater density of the minerals.

We claim:

1. A catalyst system comprising from 0.1 to 5% by weight of palladium supported on particulate carbon black (the percentage being based on the weight of non-porous carbon black in the system) wherein the catalyst system also includes a poison comprising at least one poisoning moiety selected from the group consisting of nitrogen moiety, phosphorous moiety and sulphur moiety wherein the carbon black is non-porous and wherein the ratio of the number of atoms of poisoning moiety in the poison to the number of atoms of palladium in the catalyst system is from 0.0005 to 0.25:1, said catalyst system being characterized by its high selectivity for hydrogenation of aliphatic unsaturation in copolymers which also include aromatic unsaturation.

2. A catalyst system according to claim 1 wherein the carbon black is non-porous to the extent that less than 80% of its surface area is located within open pores.

3. A catalyst system according to claim 1 wherein the carbon black contains from 0.001 to 2% by weight of free or combined sulphur.

4. A catalyst system according to claim 1 wherein the carbon black has a surface pH of from 5 to 9.

5. A catalyst system according to claim 1 wherein the poison comprises an oxyacid of phosphorus and/or one or more of the salts and/or esters of the oxyacid.

6. A catalyst system according to claim 1 wherein the poison comprises an aliphatic amine.

7. A catalyst system according to claim 1 wherein the poison comprises an aromatic heterocyclic compound of nitrogen or sulphur.

8. A catalyst system according to claim 1 wherein the poison comprises carbon disulphide or an organic sulphide, sulphoxide or a mercaptan.

9. A catalyst system according to claim 1 wherein the ratio of the number of atoms of poisoning moiety in the poison to palladium atoms in the catalyst system is from 0.001 to 0.1:1.

10. A catalytic process for the selective hydrogenation of aliphatic unsaturation in copolymers which also contain aromatic unsaturation wherein the copolymer in a solution phase is subjected to the action of hydrogen in the presence of a catalyst system comprising from 0.1 to 5% by weight of palladium supported on particulate carbon black (the percentage being based on the weight of non-porous carbon black in the system) wherein the catalyst system also includes a poison comprising at least one poisoning moiety selected from the group consisting of nitrogen moiety, phosphorous moiety and sulphur moiety wherein the carbon black is non-porous and wherein the ratio of the number of atoms of poisoning moiety in the poison to the number of atoms of palladium in the catalyst system is from 0.0005 to 0.25:1, said catalyst system being characterized by its ease of separation from the hydrogenated copolymer and by its high selectivity for hydrogenation of aliphatic unsaturation in copolymers which also include aromatic unsaturation.

11. A process according to claim 10 wherein the catalyst system comprises carbon black which is non-porous to the extent that less than 80% of its surface area is located within open pores.

12. A process according to claim 10 wherein the catalyst system comprises carbon black which contains from 0.001 to 2% by weight of free or combined sulphur.

13. A process according to claim 10 wherein the catalyst system comprises carbon black which has a surface pH of from 5 to 9.

14. A process according to claim 10 wherein the catalyst system comprises the poison which comprises an oxyacid of phosphorus and/or one or more of the salts and/or esters of the oxyacid.

15. A process according to claim 10 wherein the catalyst system comprises poison which comprises an aliphatic amine.

16. A process according to claim 10 wherein the catalyst system comprises poison which comprises an aromatic heterocyclic compound of nitrogen or sulphur.

17. A process according to claim 10 wherein the poison comprises carbon disulphide or an organic sulphide, sulphoxide or a mercaptan.

18. A process according to claim 10 wherein the ratio of the number of atoms of poisoning moiety in the poison to palladium atoms in the catalyst system is from 0.001 to 0.1:1.

* * * * *